United States Patent [19]
Hawke

[11] Patent Number: 5,664,915
[45] Date of Patent: Sep. 9, 1997

[54] TAP AND METHOD OF MAKING A TAP WITH SELECTED SIZE LIMITS

[76] Inventor: Terrence C. Hawke, 1385 Decker, Walled Lake, Mich. 48390

[21] Appl. No.: 620,919

[22] Filed: Mar. 22, 1996

[51] Int. Cl.⁶ ................................................. B23G 5/06
[52] U.S. Cl. ..................... 408/222; 76/101.1; 470/198; 408/220
[58] Field of Search ................... 408/217–220, 408/222; 470/198, 204; 76/101.1

[56] References Cited

U.S. PATENT DOCUMENTS

| | | |
|---|---|---|
| 57,124 | 8/1866 | Gregg . |
| 84,411 | 11/1868 | Clark et al. . |
| 177,731 | 4/1876 | Martin . |
| 194,469 | 8/1877 | Schaub . |
| 662,064 | 11/1900 | Ehmke . |
| 896,503 | 8/1908 | Zogg . |
| 1,232,099 | 7/1917 | Schoenert . |
| 1,265,348 | 5/1918 | Lloyd . |
| 1,293,432 | 2/1919 | Higgins . |
| 1,447,700 | 3/1923 | Wells . |
| 1,520,714 | 12/1924 | Hanson . |
| 1,718,536 | 6/1929 | Dalzen . |
| 1,748,962 | 3/1930 | Smith . |
| 1,845,063 | 2/1932 | Trbotevich . |
| 2,058,351 | 10/1936 | Pruitt . |
| 2,145,819 | 1/1939 | Swenson . |
| 3,125,772 | 3/1964 | Beck . |
| 3,355,752 | 12/1967 | Haralampiev et al. . |
| 3,945,069 | 3/1976 | Cecil . |
| 4,316,683 | 2/1982 | Schott . |
| 4,762,444 | 8/1988 | Mena . |
| 4,842,464 | 6/1989 | Green . |
| 4,934,059 | 6/1990 | Green . |
| 4,956,888 | 9/1990 | Green . |
| 5,086,532 | 2/1992 | Green . |
| 5,112,168 | 5/1992 | Glimpel . |
| 5,127,776 | 7/1992 | Glimpel . |
| 5,199,175 | 4/1993 | Green . |
| 5,222,847 | 6/1993 | Hiyama et al. . |
| 5,250,007 | 10/1993 | Green . |
| 5,316,520 | 5/1994 | Green . |
| 5,318,393 | 6/1994 | Yamada . |

FOREIGN PATENT DOCUMENTS

| | | |
|---|---|---|
| 710988 | 6/1965 | Canada . |
| 13468 | 12/1910 | Denmark . |
| 1143802 | 10/1957 | France . |
| 654626 | 12/1937 | Germany . |
| 1120845 | 12/1961 | Germany . |
| 1189830 | 3/1965 | Germany . |
| 3537087A | 4/1987 | Germany . |
| 295591 | 4/1932 | Italy . |
| 62-148118 | 7/1987 | Japan . |
| 2106219 | 4/1990 | Japan . |
| 4-348813 | 12/1992 | Japan . |
| 540711 | 1/1977 | U.S.S.R. . |
| 1028438A | 7/1983 | U.S.S.R. . |
| 1028455A | 7/1983 | U.S.S.R. . |
| 1034860A | 8/1983 | U.S.S.R. . |
| 1060365A | 12/1983 | U.S.S.R. . |
| 1134321A | 1/1985 | U.S.S.R. . |
| 1821299A1 | 6/1993 | U.S.S.R. . |
| 1571786 | 7/1980 | United Kingdom . |

*Primary Examiner*—Steven C. Bishop
*Attorney, Agent, or Firm*—John R. Benefiel

[57] ABSTRACT

A nib tap configuration in which the thread turns are of progressively increasing pitch diameter over a range of size limits associated with a standard basic pitch diameter. A particular size limit can be provided by grinding off the turns of a larger limit size. A family of taps covering an extended range of pitch diameter size limits allow selection over the extended range.

8 Claims, 2 Drawing Sheets

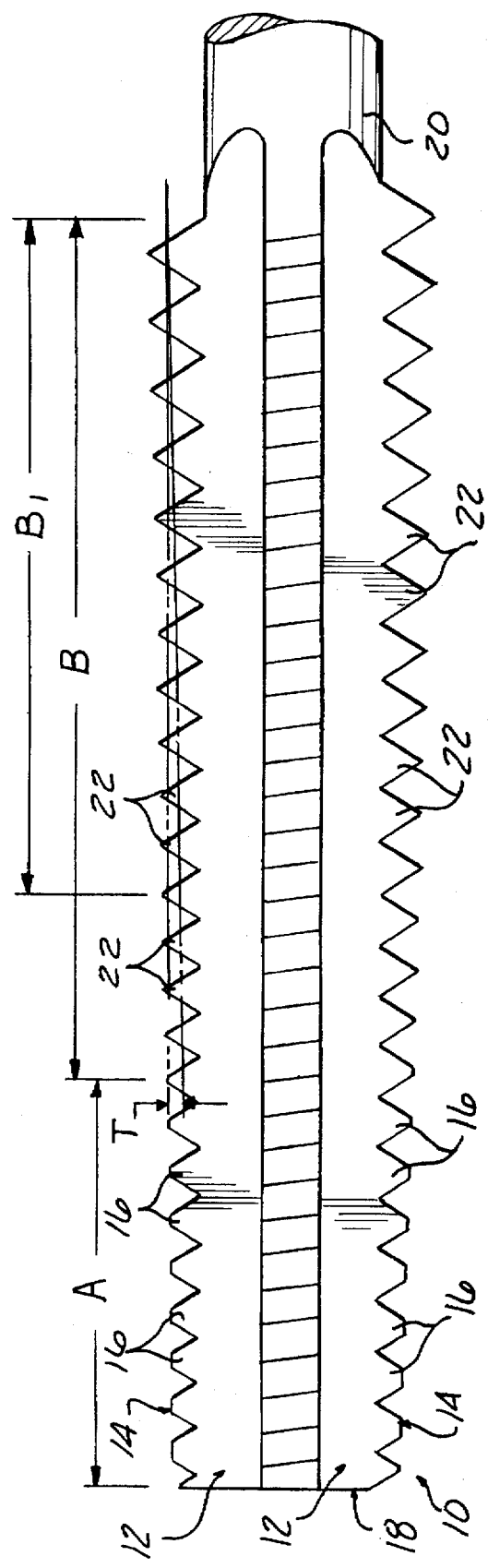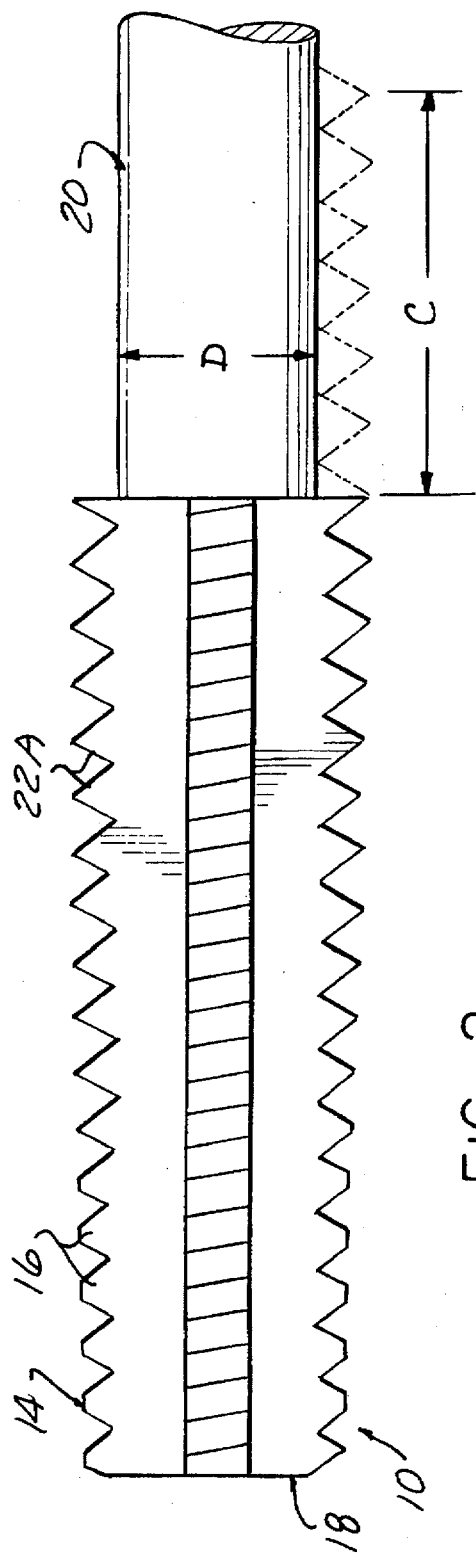

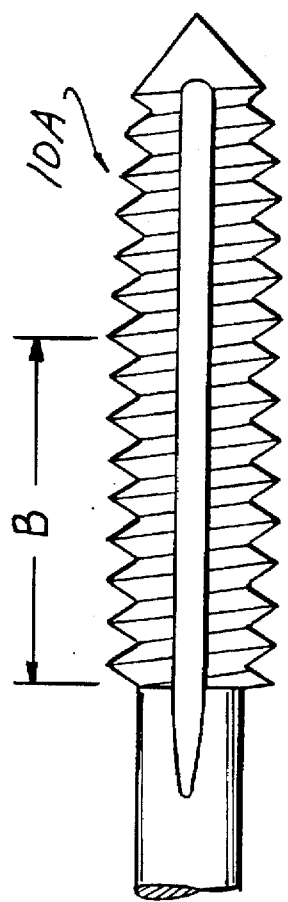
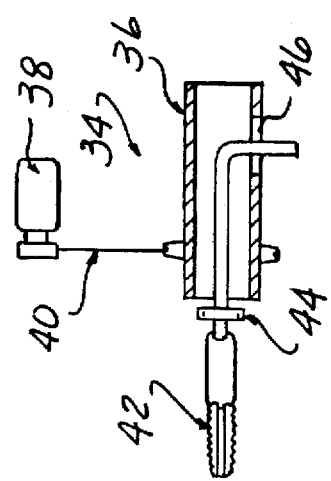
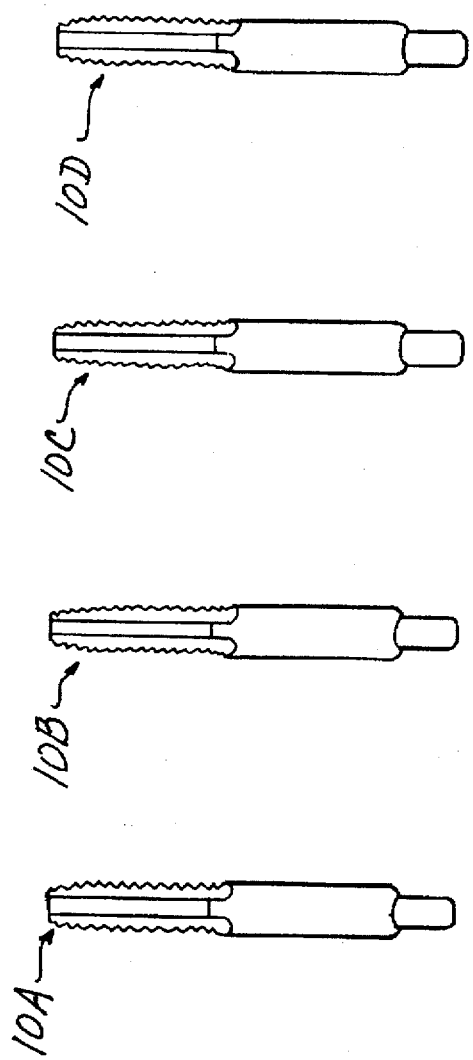

TAP AND METHOD OF MAKING A TAP WITH SELECTED SIZE LIMITS

BACKGROUND OF THE INVENTION

This invention concerns taps for forming internal threads in parts. Production of internally threaded parts such as nuts involve a tap mounted on a tap driver. The nut blanks are fed onto a chamfered end of the tap, and driven down the tap length as the tap is rotated to cut the internal threads. The threaded nuts pass off the end of the tap and onto a shank, and out of the machine off an angled end of the tap driver. A surrounding drive tube having a slot wide enough to allow the nuts to pass through drives the angled end of the tap driver. Other styles of tappers exist.

Taps specially adapted to nut threading (often referred to as "nib" taps) are configured so that only one or perhaps two turns of the threads on the tap have a pitch diameter specified for the tap, with the remaining turns adjacent the shank end slightly undersized to enable free movement of the nuts onto the driver after the nut threads are fully formed.

The production of nuts intended for a particular application involves a determination of the exact pitch diameter of the tap necessary to produce a nut that will be properly fit to its mating component.

Nib taps are not typically stocked by manufacturers. Instead users must specially order such taps from a tap manufacturer, specifying one of a series of particular tap pitch diameter "size limits" related to a standard "basic" or "nominal" pitch diameter, which the user hopes will form an internal thread of a proper class of fit to the mating part. These series of size limits are specified in the United States by GH numbers, (for "ground high") such as GH1 to GH10 or greater. Undersize size limits are specified by GL numbers for "ground low". Each size limit number represents a successive step of 0.0005 inch in a range of size limits over the basic or nominal pitch diameter of the tap, for tap sizes up to 1 inch, with 0.001 steps for taps between 1 and 1½ inches, 0.0015 inch steps for taps between 1½ and 2¼ inches and 0.002 inch steps for taps between 2¼ and 4 inches in diameters.

In metric sizes, a similar system of "D" number size limits are used.

This situation leads to several problems for the tap user.

The need to special order nib taps causes delays due to the need for the taps to be manufactured to order, the manufacturing to order also increasing costs for the manufacturer and thus raising the price to the user.

As noted above, nib taps are made with a back taper in which the thread turns are of progressively smaller pitch diameter. The front end of the tap has the crests of the threaded turns ground off to allow entry into the bore of the nut blank and to distribute cutting pressure.

This typically results in only one or two tap thread turns having a pitch diameter at a specified GH size limit range.

Sometimes the tap user cannot obtain a properly sized thread by use of the taps of the GH number which he has ordered, because of the cutting characteristics of the particular material or due to another of the numerous factors affecting the tapping process. These special order taps can not be returned to the manufacturer and become useless for production on that job. The taps can then only be held in inventory by the user in the chance that they will be useable on a future job requiring the same basic pitch diameter size limits. The cost of taps is such that this alternative is unsatisfactory.

A more common problem is created by early wear of the one or two full pitch diameter turns establishing the pitch diameter of the cut thread. These turns are subject to early wear as they bear a disproportionate share of the cutting load, or forming load for swaging taps.

For nib taps, the full pitch diameter thread turn or turns are often located in the chamfer section, and hence these turns are performing substantial cutting of the thread form at the same time as they are finish sizing the pitch diameter. This situation often leads to early wear out of the pitch diameter sizing turns, so that correctly sized parts can no longer be produced from use of that tap.

As the tap sizing turns wear, the carefully determined size limit pitch diameter is lost, and the cut nut threads are no longer in an acceptable size limit range.

It is the object of the present invention to provide a nib tap configuration allowing a standard tap or a family of standard taps which can be stocked for off the shelf delivery and can be readily adapted by the user to a selected tap pitch diameter size limit.

If a tap is not usable on a given job, the tap may be adapted for potential use on any of a number of other jobs requiring taps in a range of size limits.

It is a further object of the invention to provide a method of making a tap of a selected size limit.

It is another object of the present invention to provide a tap configuration in which the problem of excessive wear of the tap threads at the pitch diameter size limit is substantially alleviated.

SUMMARY OF THE INVENTION

These objects of the invention and others which will become apparent upon a reading of the following specification and claims are achieved by a tap configuration in which the pitch diameter of successive full form tap threads increase in pitch diameter in a direction extending away from the front end of the tap.

The progressive increase in pitch diameter is such that the threads encompass a range of size limits relating to a standard basic or nominal pitch diameter. A practical taper is on the order of 1/100 or less to provide a useable range of size limits.

To make a tap having a desired size limit, the tap has any thread turns of a pitch diameter greater than the desired pitch diameter size limit ground off down to the shank diameter, so that the rearmost remaining thread turns are of a selected pitch diameter size limit.

This tap is less subject to premature wear, since the tap thread turns ahead of those of the desired size range share a greater proportion of the thread form cutting, and the thread turns at the selected pitch diameter remove less material so as to have much longer useful life. The quality of surface finish produced is superior for this same reason.

A standard off the shelf tap or family of taps according to the invention can be stocked by manufacturers each encompassing a segment of an extended size limit range relating to a nominal or basic tap sizes. This allows the user to select a tap having what he anticipates is the proper size limit within the range of size limits of a particular standard tap in the family. The user can then grind off any oversize threads and try out the tap in the production equipment. If the results are not acceptable, a different size limit (or fraction thereof) can be tried with another (or the same tap if an additional thread is to be removed), until the correct size limit is determined. The rear threads of the other taps to be used can then be ground down to obtain the determined size limit.

DESCRIPTION OF THE DRAWINGS

FIG. 1 is a fragmentary side elevational view of a tap according to the present invention.

FIG. 2 is a fragmentary side elevational view of the tap shown in FIG. 1, modified according to the method of the present invention.

FIG. 3 is a fragmentary side elevational view of a forming tap version of the invention.

FIGS. 4A–4D are side elevational views of each tap in a family of cutting taps over an extended range of size limits.

FIG. 5 is a diagram of a typical nut threading machine having a tap according to the invention installed therein.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, FIG. 1, shows a cutting tap 10 configured according to the present invention.

Tap 10 has a series of lengthwise flutes 12 interspaced between a series of cutting lands 14 in conventional fashion, each cutting land 14 comprising a series of helical turns or threads 16.

According to concept of the present invention, the threads 16 have pitch diameters progressively increasing in the direction extending from the front end 18 of the tap 10 towards the rear end formed with the shank 20.

The crests of each thread turn 16 in the region "A" at the front of the tap are removed as per conventional practice in a region "A" along a line defining a chamfer angle, which is front tapered in the same sense as the pitch diameter, but at a steeper angle.

This leaves a region "B" of full form threads 22 which are of progressively increasing pitch diameter.

The pitch diameter taper T is such that the region "B" encompasses a portion of a range of size limits associated with a given basic pitch diameter size.

For example, for a 20 pitch spacing tap, a taper of 1/416 provides a change in pitch diameter per turn of 1/4GH number, while again for a 20 pitch spacing tap, a taper of 1/200 provides a change in pitch diameter of 1/2GH number per turn, where each GH number represents a 0.0005 inch pitch diameter range, i.e., for taps from 0 to 1 inch. Thus, for ten turns, a range of 2½ to 5 GH number size limit threads are included.

According to the concept of the present invention, the tap 10 may have one or more of the rearmost full form threads 22 ground down to the shank diameter D as necessary to leave a rearmost full form thread 22 having a pitch diameter of a desired pitch diameter size limit related to a standard basic pitch diameter.

For example, if the tap 10 has a last full form thread of a GH 10 size limit, and a taper equal to 1/4GH per thread, then eight threads would be removed as indicated in the region "C" of FIG. 2, to obtain a GH8 size limit tap. Of course, if the existing rearmost threads are of the desired size limit, none of the turns need be removed.

The tap 10 can be configured so that each thread turn corresponds to any desired fraction of a GH number size limit, for each of the full form threads in a range B–1 which leaves several full form threads after the chamfered region A.

As suggested above, the particular pitch spacing obviously affects the increment of size limit represented by each turn, for a given taper. It may be advantageous for manufacturing purposes to select a single taper for all pitch spacings and diameters. This taper must not be too steep as to not afford a reasonable range of size limits nor to cause seizing from excessive cutting loads.

A taper of about 1/100 or shallower is believed to provide practical results.

The front tapered configuration of the nib tap 10 reduces wear on the full size thread turn, since the turn 22A at full pitch diameter size is doing very little cutting, which cutting is primarily done by the forward turns. Since there results greatly reduced wear of the thread forming the correct pitch diameter thread the tap 10 will have a longer life. In addition, a higher quality of thread form is created i.e., a smoother finish.

A family of tap configurations 10A, 10B, 10C, 10D, etc., is contemplated, which may be stocked by manufacturers for off the shelf delivery. Each tap 10A–10D in the family has a series of removable threads encompassing a pitch diameter range over a portion of size limits, related to a standard basic diameter. An example is shown in FIG. 3, where tap 10A has a GL 2 to basic pitch diameter removable threads, tap 10B, basic to GH5, tap 10C GH5–GH10, tap 10D GH10–GH15, and so on.

Thus, a user can inventory a quantity of taps of one or more families, and by grinding off as many of the rear threads as necessary, create a tap exactly suited to a given production run of parts, fine tuning as necessary to obtain acceptable parts. In some instances, the tap can be used as received if the largest diameter threads are of the necessary size limit.

It is noted that as practical matter the number of threads able to be removed, will be limited to 4 or 5 so as to leave several full form threads 22.

The concept is also applicable to forming or swaging type taps 24, as indicated in FIG. 4. Such taps also have threads, but are without flutes (except for an oil slot 26) and create threads by swaging or forming, in the manner well known in the art.

However, the shank 28 must be reduced to receive formed nuts which are slidable down the shank 28 after the internal threads are formed.

The threads 30 over a rear range B to the rear of a sharply tapering thread 32 at the front section A are of progressively increasing pitch diameter extending over a range of size limits of the basic or nominal pitch diameter of the tap.

FIG. 5 shows a tap driver 34 rotated by a slotted guide sleeve 36 driven by motor 38 and belt, chain, or gear 40 in the well known manner.

A front tapered pitch diameter tap 42 according to the present invention is mounted (or integral) with the driver 34. Nuts 44 pass onto the driver after being through threaded by the tap 42 to have a pitch diameter size limit of the last thread turn on the tap. The nuts 44 pass out of a side slot of the sleeve 36 in the well known manner. Other known tap drivers may be utilized.

I claim:

1. A method of making a tap of a specific pitch diameter size limit in relation to a nominal tap size, comprising the steps of:

forming a tap having a series of thread turns of a progressively increasing pitch diameter form, with a maximum pitch diameter at a thread turn nearest a shank end of said tap, said pitch diameters of said thread turn series defining a predetermined range of size limits with respect to said nominal pitch diameter, said range including said selected pitch diameter;

grinding off as many turns as necessary to leave a thread form of a selected pitch diameter adjacent the shank end of said tap.

2. The method according to claim 1 wherein in said forming step, a series of thread turns extending through several GH number size limits are formed.

3. A method of making a tap of any given pitch diameter size limit in relation to a nominal pitch diameter size, comprising the steps of:

forming a family of taps, each tap in said family having a series of thread turns of progressively increasing pitch diameter to a maximum pitch diameter adjacent a tap shank, each tap in said family having thread turns extending over a portion of a range of pitch diameter limit sizes from the same nominal pitch diameter;

selecting a tap from said family having said given pitch diameter limit size; and, grinding off any thread turns over said given pitch diameter on said selected tap.

4. A method of making a nib tap for threading nuts of a desired pitch diameter size limit relative to a nominal pitch diameter, comprising the steps of:

forming a nib tap having a series of thread turns of progressively increasing pitch diameter to the rear of said tap, including said desired size, said series encompassing a range of pitch diameter limit sizes; and, grinding off thread turns larger than said desired size.

5. A set of taps comprising:

a plurality of taps;

each tap related to a single nominal pitch diameter size, each tap having a series of thread turns of progressively increasing pitch diameter, with a maximum pitch diameter adjacent a shank portion of said tap;

each tap in said set having a unique pitch diameter range of size limits associated with said nominal pitch diameter, whereby a desired pitch diameter tap can be selected from a tap in said series.

6. In a through tapping apparatus having a tap driver allowing nuts to progress onto said driver and a nib tap driven by said driver, the improvement comprising:

progressively increasing pitch diameter of thread turns on said tap at the turns adjacent the shank of said tap, said increasing pitch diameter thread turns extending over a range of pitch diameter size limits.

7. A thread cutting tap comprising:

an elongate body formed with a shank at a rear end, and a chamfered section at a front end;

a series of full form cutting threads extending rearwardly from said chamfered section to said shank;

said full form thread series of progressively increasing pitch diameter from said chamfer section to said shank, said pitch diameters of a size limit range relating to a standard basic pitch diameter size.

8. The tap according to claim 7 wherein said progressively increasing pitch diameter of said full form cutting threads form a taper of less than about 1/100.

* * * * *